(12) United States Patent
Hancock et al.

(10) Patent No.: US 8,891,197 B2
(45) Date of Patent: Nov. 18, 2014

(54) ADJUSTMENT OF TAPE WRITING MECHANISM, BASED ON TAPE DIMENSIONAL STABILITY AND POSITIONAL ERROR SIGNAL DISTRIBUTION

(71) Applicant: International Business Machines Corporation, Armonk, NY (US)

(72) Inventors: Reed A. Hancock, Tucson, AZ (US); Kevin B. Judd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/777,676

(22) Filed: Feb. 26, 2013

(65) Prior Publication Data
US 2014/0240866 A1 Aug. 28, 2014

(51) Int. Cl.
G11B 5/584 (2006.01)
G11B 27/36 (2006.01)
G11B 15/04 (2006.01)
G11B 21/10 (2006.01)

(52) U.S. Cl.
CPC .................................. *G11B 21/103* (2013.01)
USPC ............................ 360/77.12; 360/31; 360/60

(58) Field of Classification Search
None
See application file for complete search history.

(56) References Cited

U.S. PATENT DOCUMENTS

| 6,141,174 | A | 10/2000 | Judge et al. |
|---|---|---|---|
| 6,222,698 | B1 | 4/2001 | Barndt et al. |
| 6,545,834 | B1 | 4/2003 | Melbye |
| 6,690,535 | B2 | 2/2004 | Wang |
| 7,158,339 | B2 | 1/2007 | Kuse et al. |
| 7,738,212 | B2 | 6/2010 | Saliba et al. |
| 7,826,169 | B2 | 11/2010 | Saliba et al. |
| 8,027,111 | B2 | 9/2011 | Cideciyan et al. |
| 8,094,402 | B2 | 1/2012 | Bui et al. |
| 8,213,105 | B2 | 7/2012 | Bui et al. |
| 8,711,501 | B2 | 4/2014 | Childers et al. |
| 2002/0191321 | A1* | 12/2002 | Anderson ........................ 360/60 |
| 2004/0001277 | A1 | 1/2004 | Chliwnyj et al. |
| 2009/0109566 | A1* | 4/2009 | Tanaka et al. ............... 360/77.12 |
| 2009/0213488 | A1 | 8/2009 | Saliba et al. |

FOREIGN PATENT DOCUMENTS

| CN | 102027538 | 4/2011 |
|---|---|---|
| CN | 102576545 | 7/2012 |

OTHER PUBLICATIONS

English translation of CN102027538 dated Apr. 20, 2011.
English translation of CN102576545 dated Jul. 11, 2012.
PCT International Search Report and Written Opinion dated May 16, 2014 for Application No. PCT/IB2014/058292 filed Jan. 15, 2014.

* cited by examiner

*Primary Examiner* — Andrew L Sniezek
(74) *Attorney, Agent, or Firm* — Rabindranath Dutta; Konrad, Raynes, Davda and Victor LLP

(57) ABSTRACT

A determination is made in a tape drive of a potential deviation in tape dimensional stability of a tape, based on a current environmental condition and environmental conditions in which the tape is expected to be operational. A writing mechanism to write data to the tape is adjusted, based on the potential deviation in the tape dimensional stability.

16 Claims, 6 Drawing Sheets

ADJUSTMENT OF TAPE WRITING MECHANISM, BASED ON TAPE DIMENSIONAL STABILITY AND POSITIONAL ERROR SIGNAL DISTRIBUTION

BACKGROUND

1. Field

The disclosure relates to a method, system, and article of manufacture for the adjustment of a tape writing mechanism, based on tape dimensional stability and positional error signal distribution.

2. Background

In the design of a tape drive system, the expansion and contraction of the magnetic tape may have to be taken into account. Such expansions and contractions of the magnetic tape cause a Change in the dimension of the magnetic tape. Such dimensional changes of the magnetic tape may be caused by environmental factors, via aging of the magnetic tape, and via other factors. For example, a magnetic tape may change its dimensions when exposed to different temperatures and humidities. Such changes in the dimension of the magnetic tape may impact the successful reading of data that has been previously written on the tape under a different environment condition.

Tape Dimensional Stability (TDS) is a measure of the positional stability of the magnetic data tracks relative to each other and is a function of the tape properties and environmental effects such as temperature, humidity, tension, creep, etc. These environmental factors can cause the tape to expand or contract laterally, across the width of the tape. Therefore, when a tape is written to in one environmental condition and subsequently read from in another environmental condition, the position of the data tracks across the tape width can change enough to cause signal degradation or read errors. Minimizing tape dimensional changes may ensure the robustness of the reading data in a different environmental condition.

In a tape drive, a head assembly of a tape drive may include servo heads that read data from servo tracks or bands on the tape. Mechanisms may be included in the tape drive to analyze data from the servo tracks to generate a position error signal (PES), and the PES may used by the tape drive to position the head assembly on the tape. A larger standard deviation in the PES means that the edges of the magnetic recording of data on the tape are more jagged in comparison to a smaller standard deviation in the PES.

SUMMARY OF THE PREFERRED EMBODIMENTS

Provided are a method, a system, and a computer program in which a determination is made in a tape drive of a potential deviation in tape dimensional stability of a tape, based on a current environmental condition and environmental conditions in which the tape is expected to be operational. A writing mechanism to write data to the tape is adjusted, based on the potential deviation in the tape dimensional stability, In further embodiments, the writing mechanism is adjusted based on a positional error signal distribution.

In still further embodiments, the tape dimensional stability is a measure of potential tape dimensional changes that are caused by changes in one or more environmental conditions. The positional error signal distribution is a measure of positional error in writing data, measured by servo signals written on the tape.

In additional embodiments, the adjusting of the writing mechanism to write the data to the tape further comprises allowing relatively small positional errors when the potential deviation in tape dimensional stability is relatively large, and allowing relatively large positional errors when the potential deviation in tape dimensional stability is relatively small.

In yet additional embodiments, data is written more precisely to the tape, in response to determining that the potential deviation in the tape dimensional stability is large in comparison to determining that the potential deviation in the tape dimensional stability is small.

BRIEF DESCRIPTION OF THE DRAWINGS

Referring now to the drawings in which like reference numbers represent corresponding parts throughout.

DETAILED DESCRIPTION

Figure 1:
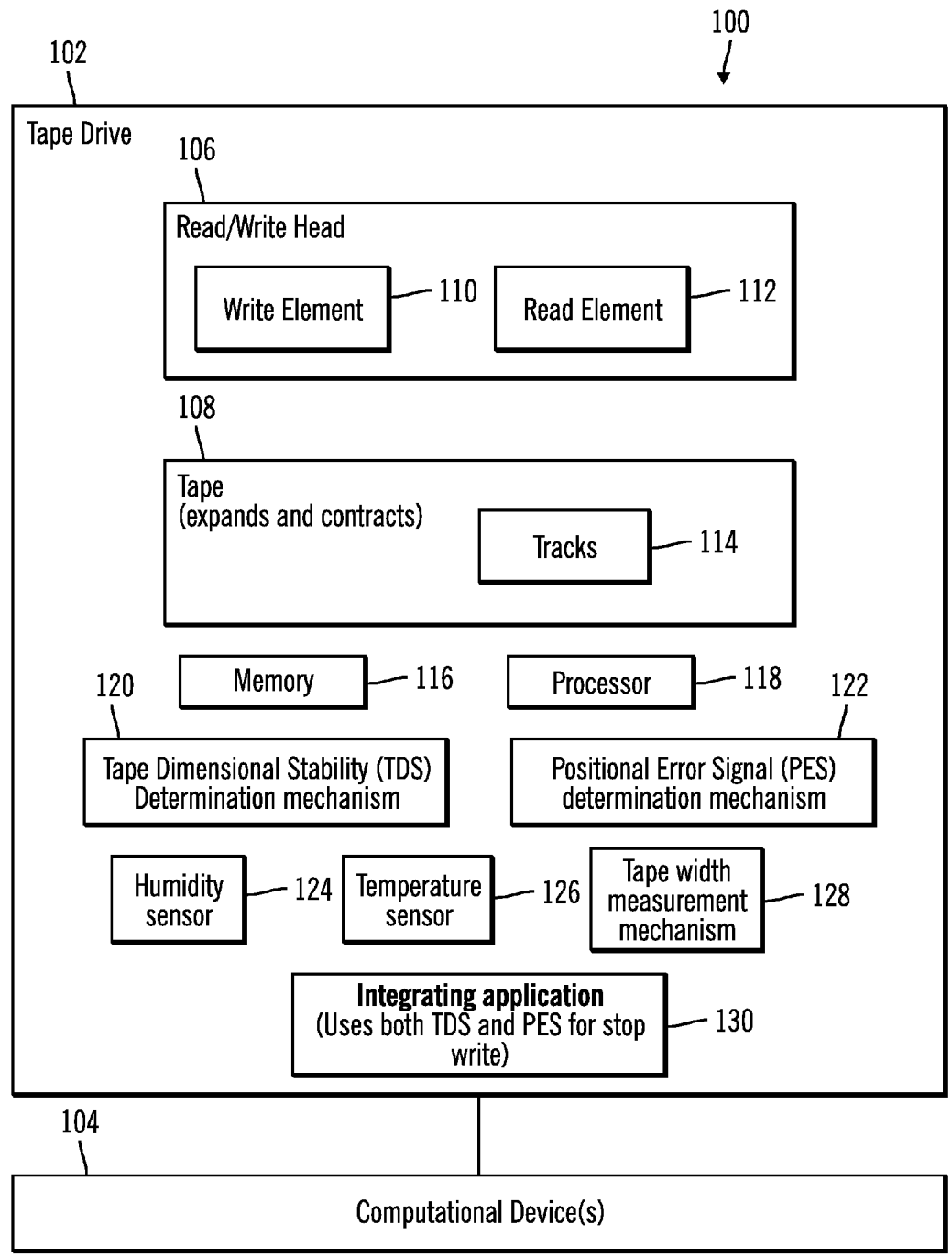
FIG. 1 illustrates a block diagram of a computing environment that includes a tape drive that is optionally coupled to a computational device, in accordance with certain embodiments.

In the following description, reference is made to the accompanying drawings which form a part hereof and which illustrate several embodiments. It is understood that other embodiments may be utilized and structural and operational changes may be made.

When data is written on a tape in one environment, and then an attempt is made to read data from the tape in another environment, the tape may have changed its dimensions such that the written tracks are no at different locations than when they were originally written. When designing a tape drive system, this must be taken into account, and typically this effect of changes in tape dimension is minimized by making the reader smaller. This allows the reader to have a different position laterally within the written track, but still be able to fully read the written data. However, smaller readers may mean that there is less signal amplitude while reading and it is harder to actually read the data. As a result, it may not always be desirable or possible to make the reader smaller. Furthermore, in certain situations where the environmental conditions do not change substantially and there is little or no TDS variation, a reader that is designed to be small is not necessary because a larger reader may be adequate to take account of TDS variations. In such situations, designing the reader to be small is undesirable.

Certain embodiments provide a mechanism for determining stopwrite criteria (i.e., a criteria, on when to stop writing to tape) based on both tape dimensional stability and position error signals found while writing data to the tape. Certain embodiments measure the current environment (e.g., temperature, humidity, etc.) using sensors on the drive and then adjust the stopwrite criteria such that the tracks are written such that a larger PES is tolerated when TDS effects are small, and a smaller PES is maintained when TDS effects are large.

Since TDS moves the reader from the center of the written track towards one of the edges, certain embodiments provide a mechanism to ensure that even with this reduced reader guard band, the reader stays on the written track. Since variable stopwrite concept is based upon statistical measurements of the drive and setting stopwrite such that there is sufficient reader guard band margin, it is well suited to take into account the reduced margins that come from TDS effects. In certain embodiments, during the writing process, the current environmental state can be measured. Then, it can be calculated how much potential change in environmental state may be possible during a subsequent read operation. Once this value is determined, the amount the tape can contract or expand can be calculated. Once this is known, the reader guard band that potentially would be available is known. With this parameter, an appropriate stopwrite can be chosen based on the current writing PES distribution. If writing is done at one corner of the environmental specification window, then a larger amount of TDS may be possible, and the drive will have to write very well (i.e., small standard deviation in the PES) to ensure that the reader stays on the written track when the reader is not centered on the track. If the wilting is done in the middle of the environmental specification, then there is less TDS if the reading occurs at the corner of the environmental specification. Therefore, the PES would have to be less well controlled.

EXEMPLARY EMBODIMENTS

FIG. 1 illustrates a block diagram of a computing environment 100 that includes a tape drive 102 that may optionally be coupled to one or more computational devices 104, in accordance with certain embodiments.

The tape drive 102 includes at least one read/write head 106 that is controllable to write data to a tape 108 and also read data from the tape 108. The writing of data to the tape 108 may be performed by a write element (e.g., a write head) 110 that is a part of the read/write head 106, and the reading of data from the tape 108 may be performed by a read element (e.g., a read head) 112 that is part of the read/write head 106. The data is written onto and read from tracks 114 that are maintained on the tape 108.

In certain embodiments, the tape 108 may expand and contract as a result of environmental changes in temperature or humidity or because of the aging of the tape 108. In such a situation the width of the tracks 114 may change. For example, in an exemplary embodiment a track of width of 1 micron may expand to a width of 1.000001 micron.

The tape drive 102 may also include a memory 116, a processor 118, a tape dimensional stability (TDS) determination mechanism 120, and a positional error signal determination mechanism 122. The tape dimensional stability determination mechanism 120 and the positional error signal determination mechanism 122 may be implemented via hardware, software, firmware or any combination thereof. The tape dimensional stability determination mechanism 120 may use data provided by a humidity sensor 124, a temperature sensor 126, and a tape width measurement mechanism 128 included in the tape drive 102, and may perform operations by executing operations on the processor 118 based on instructions stored in the memory 116 to determine TDS effects on the tape 108. The tape positional error signal (PES) determination mechanism 122 may perform operations by executing operations on the processor 118 based on instructions stored in the memory 116 to determine PES effects of write writing data to the tape 108.

The tape drive 102 may also include an integrating application 130 that uses both TDS and PES information provided by the Tips determination mechanism 120 and the PES determination mechanism 122 for determining when to stop writing to the tape 108 and when to continue writing to the tape 108. The integrating application 130 may perform operations by executing operations on the processor 118 based on instructions stored in the memory 116, and may be implemented in hardware, software, firmware or any combination thereof. In certain embodiments, the integrating application 130 provides a mechanism for determining a criteria, on when to stop writing to the tape 108, based on both tape dimensional stability and position error signals found while writing data to the tape 108.

The computational device 104 that is optionally coupled to the tape drive 102 may comprise any suitable computational device including those presently known in the art, such as, a personal computer, a workstation, a server, a mainframe, a hand held computer, a palm top computer, a telephony device, a network appliance, a blade computer, a server, a storage controller, etc. In certain embodiments, certain operations performed by the TDS application 120, the PES application 122, and the integrating application 130 may be implemented in the computational device 104.

Therefore, FIG. 1 illustrates certain embodiments in which an integrating application 130 uses both TDS and PES information to determine when to stop writing data and when to continue to write data on the tape 108, such that the written data is capable of being read under operational conditions in which the tape drive 102 is used.

Figure 2:
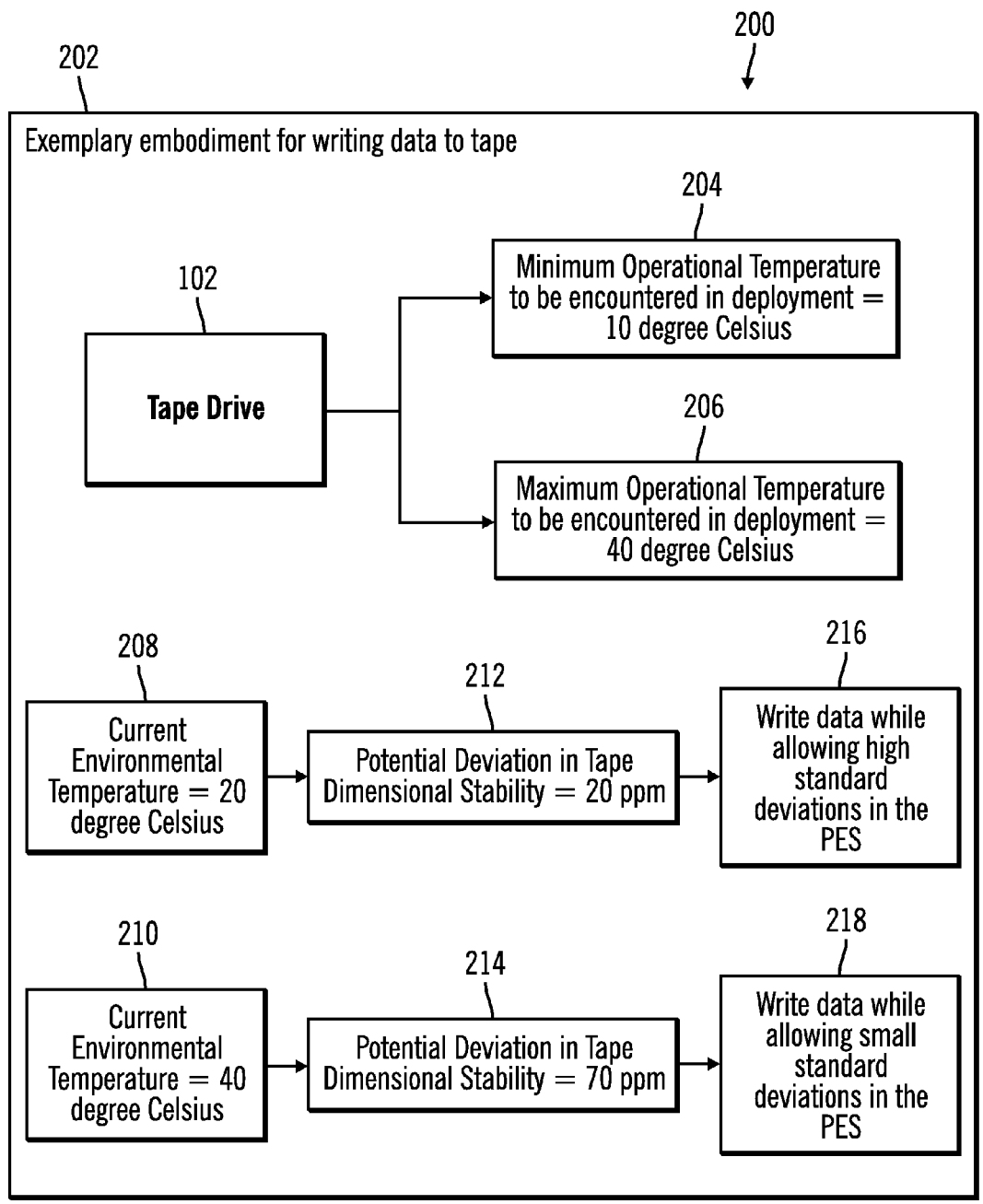
FIG. 2 illustrates a block diagram that shows exemplary embodiment for writing data to a tape, in accordance with certain embodiments.

FIG. 2 illustrates a block diagram 200 that shows an exemplary embodiment 202 for writing data to a tape (e.g., tape 108), in accordance with certain embodiments. In certain embodiments, a user may deploy a tape drive 102 at a minimum temperature of 10 degree Celsius (shown via reference numeral 204) and a maximum temperature of 40 degree Celsius (shown via reference numeral 206). In FIG. 2, two examples are shown for temperatures at which data may be written to a tape in the tape drive 102. In a first example (shown via reference numeral 208) the current environmental temperature is 20 degree Celsius, and in a second example (shown via reference numeral 210) the current environment temperature is 40 degree Celsius. Since the temperature range during deployment varies from 10 degree Celsius to 40 degree Celsius (as shown via reference numerals 204, 206) the potential maximum change in tape dimension that may occur during reading, after writing data at 20 degree Celsius, is likely to be less than the potential maximum change in tape dimension that may occur during reading after writing data at 40 degree Celsius. It may be noted that if data is written at 40 degree Celsius and then read at 10 degree Celsius, the temperature difference is 30 degrees, whereas if the data is written at 20 degree Celsius and is read either at 10 degree or 40 degree Celsius (the extremes of the operational temperature range during deployment), the maximum possible temperature difference while reading is 20 degree Celsius (which takes place when reading is performed at 40 degree Celsius). Therefore, the potential deviation in tape dimensional stability is likely to be higher (an exemplary value of 70 parts per million shown via reference numeral 214) when the current environmental temperature is 40 degree Celsius, in comparison to the potential deviation in tape dimensional stability (an exemplary value of 20 parts per million shown via reference numeral 212) when the current environmental temperature is 20 degree Celsius.

In certain embodiments, when the potential deviation of the tape dimensional stability is high (i.e., the potential for expansion or contraction is high), the integrating application 130 writes data to the tape by allowing only small standard deviations in the PES (as shown via, reference numeral 218), whereas when the potential deviation is the tape dimensional stability is low (i.e., the potential for expansion or contraction is low), the integrating application 130 writes data to the tape by allowing high standard deviations in the positional error signals (as shown via reference numeral 216). The standard deviation of PES may be expressed in microns. For example, if there is no positional error signal observed while writing data to tape the PES value is 0 micron, i.e., the standard deviation of PES is Omicron, and if the PES value is 1 micron then the standard deviation of the measured PES is 1 micron. The greater the measured PES the greater is the positional error.

Therefore, certain embodiments shown in FIG. 2 allow the writing of data with greater positional errors when the TDS is likely to small, and allow the writing of data with smaller positional errors when the TDS is likely to be high. When data is written with greater positional errors data can be written faster and the tape can be filled to a larger capacity, whereas when data is allowed to be written with small positional errors only, the writing of data may have to be stopped for significant durations of time, and as a result data can be written much slower and the tape can be filled to a smaller capacity.

Figure 3:
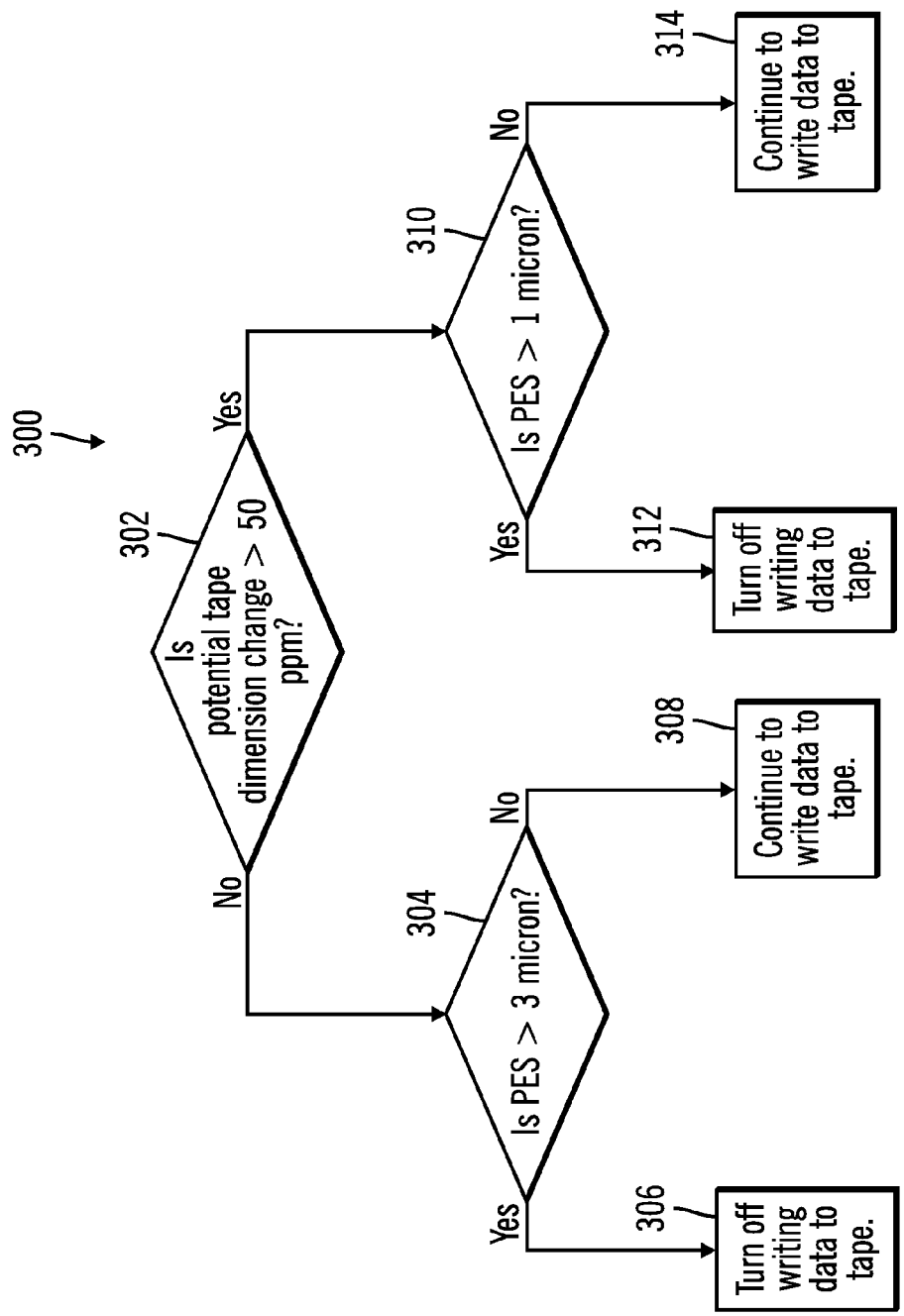
FIG. 3 illustrates a first flowchart that shows how data is written to a tape based on potential tape dimension changes and positional error signal distributions, in accordance with certain embodiments.

FIG. 3 illustrates a first flowchart 300 that shows how data is written to a tape (e.g., tape 108), based on potential tape dimension changes and positional error signal distributions, in accordance with certain embodiments. The operations shown in FIG. 3 may be implemented in the tape drive 102 via at least the integrating application 130. In certain alternative embodiments the integrating application 130 may be implemented in the computational device 104, and at least some of the operations shown in FIG. 3 may be implemented in the computational device 104.

Control starts at block 302 in which the integrating application 130 determines whether the potential tape dimension change exceeds 50 parts per million. If not, then the tape dimensional changes are small and a determination is made at block 304 if the PES is greater than 3 micron. If the PES is greater than 3 micron then control proceeds to block 306, and the writing of data to tape is turned off by the integrating application 130, and if the PES is not greater than 3 micron data is written to the tape (block 308).

If at block 302, the integrating application 130 determines that the potential tape dimension change exceeds 50 parts per million, then the tape dimensional changes are large and a determination is made at block 310 as to whether the PES is greater than 1 micron. If the PES is greater than 1 micron then control proceeds to block 312, and the writing of data to tape is turned off by the integrating application 130, and if the PES is not greater than 1 micron then data is written to the tape (block 314). It should be noted that the 50 parts per million value for the potential tape dimension change, and the 1 micron and 3 micron values for the PES as used in FIG. 3 are examples, and other embodiments may use different values.

Therefore, FIG. 3 shows that the integrating application 130 tolerates a higher value of PES before performing stopwrite (i.e., turning off writing of data to tape) when the tape dimensional changes are small, whereas the integrating application 130 tolerates a lower value of PES before performing stopwrite when the tape dimensional changes are large.

Figure 4:
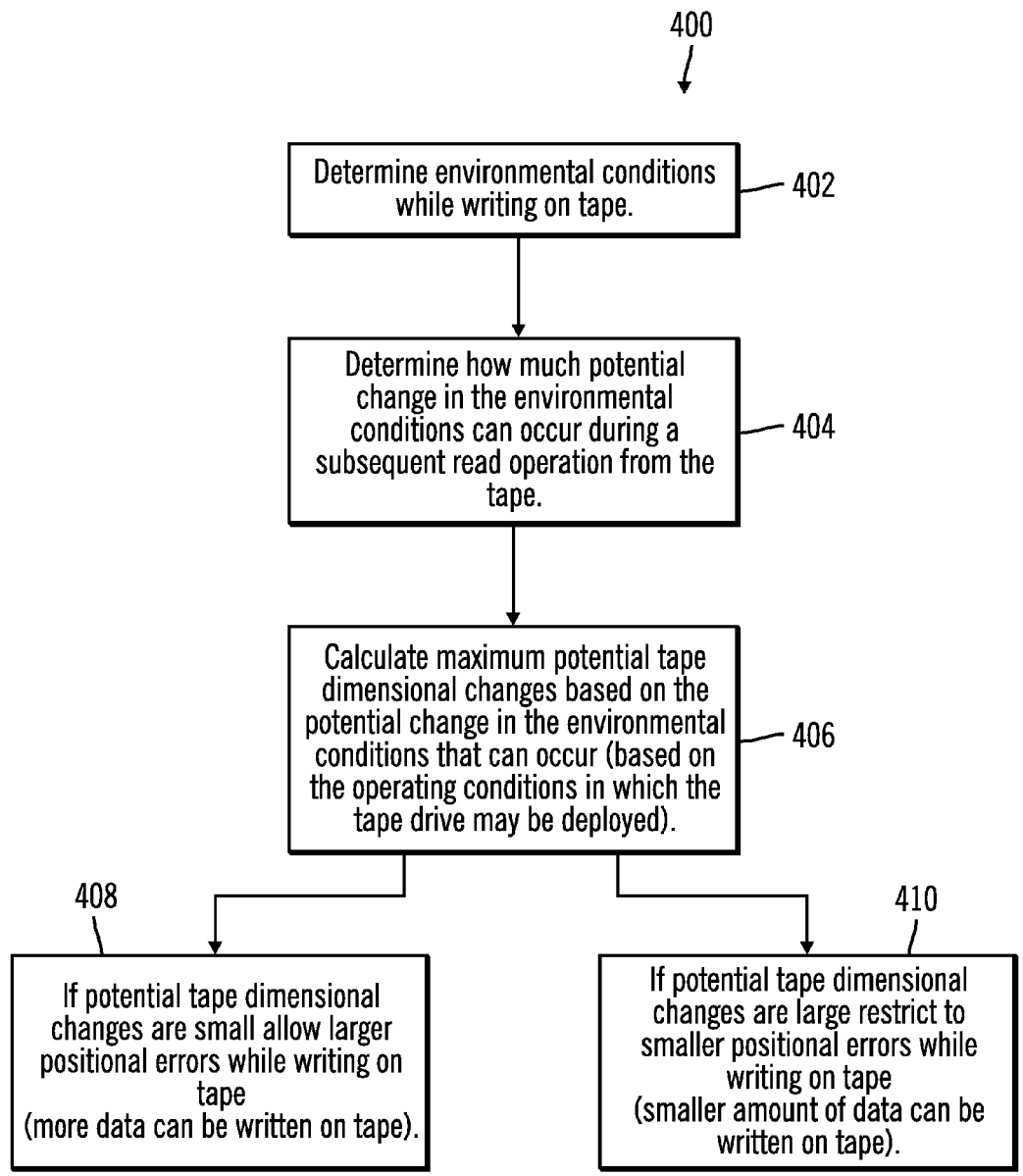
FIG. 4 illustrates a second flowchart that shows how data is written to a tape based on potential tape dimension changes and positional error signal distributions, in accordance with certain embodiments.

FIG. 4 illustrates a second flowchart 400 that shows how data is written to a tape (e.g., tape 108), based on potential tape dimension changes and positional error signal distributions, in accordance with certain embodiments. The operations show in FIG. 4 may be implemented in the tape drive 102 via at least the integrating application 130. In certain alternative embodiments the integrating application 130 may be implemented in the computational device 104, and at least some of the operations shown in FIG. 4 may be implemented in the computational device 104.

Control starts at block 402 in which the integrating application 130 determines environmental conditions while writing data on tape 108. The integrating application 130 determines (at block 404) how much potential change in the environmental conditions can occur during a subsequent read operation from the tape in potential deployment scenarios of the tape drive 102.

The integrating application 130 calculates (at block 406) the maximum potential tape dimensional changes based on the potential change in the environmental conditions that can occur, based on the operating conditions in which the tape drive 102 may be deployed.

From block 406, control proceeds to block 408 and 410. If potential tape dimensional changes are small then the integrating application 130 allows (at block 408) larger positional errors while writing on tape (i.e., more data can be written on tape), However, if potential tape dimensional changes are large the integrating application restricts (at block 410) the tape drive to have smaller positional errors while writing on tape (i.e., smaller amount of data can be written on tape).

Therefore, FIG. 4 illustrates certain embodiments in which the PES variation that is tolerated is dependant of the amount of potential tape dimensional changes that can occur in deployment scenarios after the writing of data on tape. The writing mechanism is adjusted accordingly.

Figure 5:
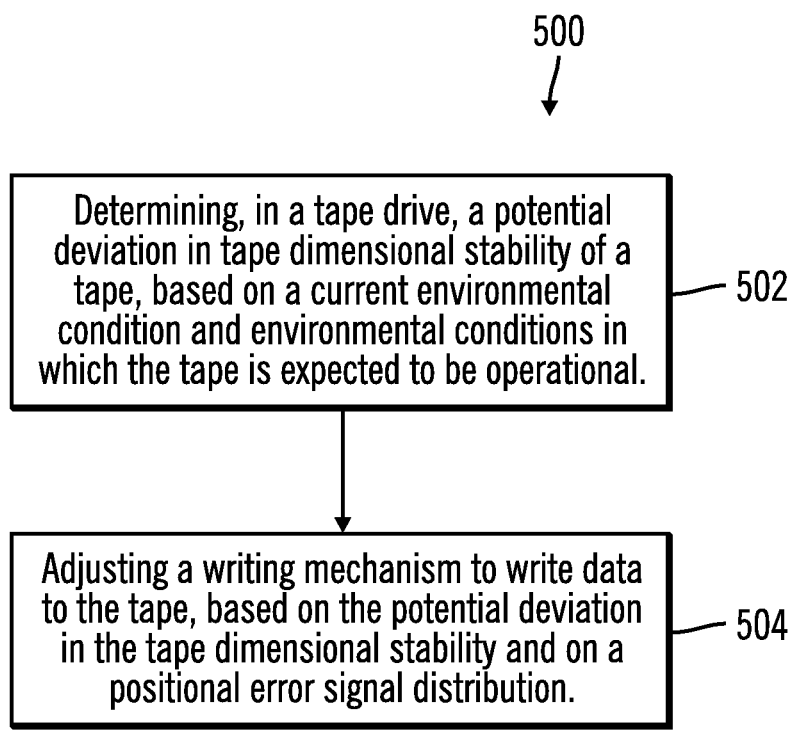
FIG. 5 illustrates a third flowchart that shows how data is written to a tape based on potential tape dimension changes and positional error signal distributions, in accordance with certain embodiments.

FIG. 5 illustrates a third flowchart 500 that shows how data is written to a tape (e g., tape 108), based on potential tape dimension changes and positional error signal distributions, in accordance with certain embodiments. The operations show in FIG. 5 may be implemented in the tape drive 102 via at least the integrating application 130. In certain alternative embodiments the integrating application 130 may be implemented in the computational device 104, and at least some of the operations shown in FIG. 5 may be implemented in the computational device 104.

Control starts at block 502, in which a determination is made in a tape drive 102, of a potential deviation in tape dimensional stability of a tape 108, based on a current environmental condition and environmental conditions in which the tape is expected to be operational. An integrating application 130 adjusts (at block 504) a writing mechanism to write data to the tape, based on the potential deviation in the tape dimensional stability and on a positional error signal distribution.

Therefore, FIGS. 1-5 illustrates certain embodiments, in which both TDS and PES information are used while determining whether or not to write data on a tape, in order to allow reading of data from the tape in a different operating environment that the operating environment in which the data is written to the tape.

Certain embodiments provided in FIGS. 1-5 do not have to assume worst case TDS when designing the write/read head geometry, such that advantages may be taken of a larger reader for the majority of the time when TDS effects may be unimportant. If the tape drive detects potential TDS due to high or low temperature or humidity, then the stopwrite criteria is tightened to ensure good reading, even with significant TDS effects.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and, conventional procedural programming languages, such as the "C" programming language or similar programming languages. The program code may execute entirely on the user's computer, partly on the user's computer, as a stand/alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
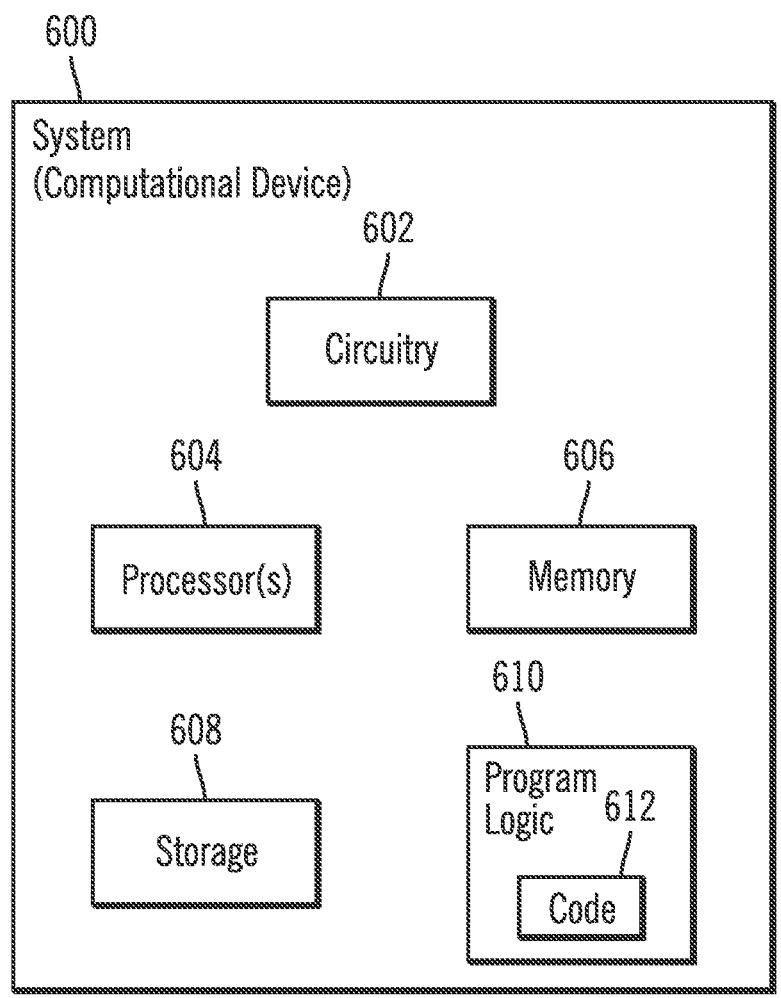
FIG. 6 illustrates a block diagram of a computational system that shows certain elements that may be included in the computational device of FIG. 1, in accordance with certain embodiments.

FIG. 6 illustrates a block diagram that shows certain elements that may be included in the computational device 104 in accordance with certain embodiments. The system 600 may comprise the computational device 104 and may include a circuitry 602 that may in certain embodiments include at least a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment" "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    determining, in a tape drive, a potential deviation in tape dimensional stability of a tape, based on a current environmental condition and environmental conditions in which the tape is expected to be operational; and
    adjusting a writing mechanism to write data to the tape, based on the potential deviation in the tape dimensional stability, wherein the adjusting of the writing mechanism to write the data to the tape further comprises:
    allowing relatively small positional errors when the potential deviation in tape dimensional stability is relatively large; and
    allowing relatively large positional errors when the potential deviation in tape dimensional stability is relatively small.

2. The method of claim 1, where the writing mechanism is adjusted based on a positional error signal distribution.

3. The method of claim 2, wherein:
    the tape dimensional stability is a measure of potential tape dimensional changes that are caused by changes in one or more environmental conditions; and
    the positional error signal distribution is a measure of positional error in writing data, measured by servo signals written on the tape.

4. The method of claim 1, wherein data is written more precisely to the tape, in response to determining that the potential deviation in the tape dimensional stability is large in comparison to determining that the potential deviation in the tape dimensional stability is small.

5. A tape drive, comprising:
    a memory; and
    a processor, wherein the processor performs operations, the operations comprising:
    determining a potential deviation in tape dimensional stability of a tape, based on a current environmental condition and environmental conditions in which the tape is expected to be operational; and
    adjusting a writing mechanism to write data to the tape, based on the potential deviation in the tape dimensional stability, wherein the adjusting of the writing mechanism to write the data to the tape further comprises:
    allowing relatively small positional errors when the potential deviation in tape dimensional stability is relatively large; and
    allowing relatively large positional errors when the potential deviation in tape dimensional stability is relatively small.

6. The tape drive of claim 5, where the writing mechanism is adjusted based on a positional error signal distribution.

7. The tape drive of claim 6, wherein:
    the tape dimensional stability is a measure of potential tape dimensional changes that are caused by changes in one or more environmental conditions; and
    the positional error signal distribution is a measure of positional error in writing data, measured by servo signals written on the tape.

8. The tape drive of claim 5, wherein data is written more precisely to the tape, in response to determining that the potential deviation in the tape dimensional stability is large in comparison to determining that the potential deviation in the tape dimensional stability is small.

9. A computational device in communication with a tape drive, the computational device:

a memory; and a processor, wherein the processor performs operations, the operations comprising:

determining a potential deviation in tape dimensional stability of a tape stored in the tape drive, based on a current environmental condition and environmental conditions in which the tape is expected to be operational; and adjusting a writing mechanism to write data to the tape, based on the potential deviation in the tape dimensional stability, wherein the adjusting of the writing mechanism to write the data to the tape further comprises:

allowing relatively small positional errors when the potential deviation in tape dimensional stability is relatively large; and allowing relatively large positional errors when the potential deviation in tape dimensional stability is relatively small.

10. The computational device of claim 9, where the writing mechanism is adjusted based on a positional error signal distribution.

11. The computational device of claim 10, wherein:

the tape dimensional stability is a measure of potential tape dimensional changes that are caused by changes in one or more environmental conditions; and the positional error signal distribution is a measure of positional error in writing data, measured by servo signals written on the tape.

12. The computational device of claim 9, wherein data is written more precisely to the tape, in response to determining that the potential deviation in the tape dimensional stability is large in comparison to determining that the potential deviation in the tape dimensional stability is small.

13. A computer program product, the computer program product comprising:

a non-transitory computer readable storage medium having computer readable program code embodied therewith, the computer readable program code configured to perform operations on a tape drive, the operations comprising:

determining a potential deviation in tape dimensional stability of a tape, based on a current environmental condition and environmental conditions in which the tape is expected to be operational; and adjusting a writing mechanism to write data to the tape, based on the potential deviation in the tape dimensional stability, wherein the adjusting of the writing mechanism to write the data to the tape further comprises:

allowing relatively small positional errors when the potential deviation in tape dimensional stability is relatively large; and allowing relatively large positional errors when the potential deviation in tape dimensional stability is relatively small.

14. The computer program product of claim 13, where the writing mechanism is adjusted based on a positional error signal distribution.

15. The computer program product of claim 14, wherein:

the tape dimensional stability is a measure of potential tape dimensional changes that are caused by changes in one or more environmental conditions; and the positional error signal distribution is a measure of positional error in writing data, measured by servo signals written on the tape.

16. The computer program product of claim 13, wherein data is written more precisely to the tape, in response to determining that the potential deviation in the tape dimensional stability is large in comparison to determining that the potential deviation in the tape dimensional stability is small.

* * * * *